UNITED STATES PATENT OFFICE.

FELIPE DE LUCIO, OF HUARAUCACA, PERU.

PROCESS OF TREATING VANADIUM ORES.

No. 863,076.    Specification of Letters Patent.    Patented Aug. 13, 1907.

Application filed March 26, 1907. Serial No. 364,725.

*To all whom it may concern:*

Be it known that I, FELIPE DE LUCIO, a resident of Huaraucaca, Peru, have invented certain new and useful Improvements in Processes of Treating Vanadium Ores; and I do hereby declare the following to be a full, clear, and exact description of the invention, such as will enable others skilled in the art to which it appertains to make and use the same.

My invention relates to an improved process of treating vanadium ores, the object of the invention is to provide an improved leaching process using and consuming only hypochlorite of calcium and steam, as the main alkaline dissolvent (hypochlorite of sodium) is regenerated in the process.

A further object is to provide an improved process extremely easy to carry out, better adapted for vanadium ores and cheaper than other known processes.

With these objects in view, the invention consists in certain novel steps in the process which will be more fully hereinafter described and pointed out in the claims.

Oxidized ores (or roasted sulfureted ores) are first boiled with a solution of hypochlorite of sodium, containing more than six atoms of sodium to one molecule of vanadic acid in the ore. This will oxidize all the vanadium to pentoxid, chlorin will be evolved, and the resulting vanadate of sodium is then dissolved as such and extracted with hot water. The solution of alkaline vanadate, when cold, is treated with a like amount of hypochlorite of calcium. Vanadate of calcium is precipitated and hypochlorite of sodium regenerated, which latter can be used again for the treatment of new ores, increasing its content of alkaline hypochlorite to the required amount.

It will thus be seen that my improved process is a leaching process, using and consuming only hypochlorite of calcium and steam, as the main alkaline (hypochlorite of sodium) dissolvent is regenerated in the process.

Slight changes might be made in the several steps of the process and I do not, therefore, restrict myself to the exact steps set forth.

Having fully described my invention, what I claim as new and desire to secure by Letters-Patent is:—

1. The process of treating vanadium ores, which consists in boiling oxidized or roasted sulfureted ores with a solution of hypochlorite of sodium to oxidize the vanadium and evolve chlorin, and extracting the resulting vanadate of sodium with hot water.

2. The process of treating vanadium ores which consists in boiling oxidized or roasted sulfureted ores with a solution of hypochlorite of sodium containing as a minimum six atoms of sodium to one molecule of vanadic acid in the ore to oxidize the vanadium to pentoxid, chlorin is evolved, and extracting the resulting vanadate of sodium as such with hot water.

3. The process of treating vanadium ores, which consists in boiling oxidized or roasted sulfureted ores with a solution of hypochlorite of sodium to oxidize the vanadium and evolve chlorin, extracting the resulting vanadate of sodium with hot water, treating the alkaline vanadate when cold with a like amount of hypochlorite of calcium to precipitate the vanadate of calcium and regenerating the hypochlorite of sodium.

In testimony whereof, I have signed this specification in the presence of two subscribing witnesses.

FELIPE DE LUCIO.

Witnesses:
ALF. SALOMON,
W. THOMPSON.